United States Patent
Joklik et al.

(10) Patent No.: US 7,435,080 B2
(45) Date of Patent: Oct. 14, 2008

(54) SYSTEM AND METHOD FOR FLAME STABILIZATION AND CONTROL

(75) Inventors: Richard G. Joklik, Annapolis, MD (US); Richard J. Roby, Columbia, MD (US); Michael S. Klassen, Columbia, MD (US); John L. Battaglioli, Glenville, NY (US); Andrew J. Hamer, Columbia, MD (US); Diwakar Vashishat, Columbia, MD (US)

(73) Assignee: Combustion Science & Engineering, Inc., Columbia, MD (US)

( * ) Notice: Subject to any disclaimer, the term of this patent is extended or adjusted under 35 U.S.C. 154(b) by 221 days.

(21) Appl. No.: 11/033,180

(22) Filed: Jan. 12, 2005

(65) Prior Publication Data
US 2006/0046218 A1 Mar. 2, 2006

Related U.S. Application Data

(60) Provisional application No. 60/634,286, filed on Dec. 9, 2004, provisional application No. 60/535,716, filed on Jan. 12, 2004.

(51) Int. Cl.
*C10L 10/00* (2006.01)
*F23J 7/00* (2006.01)
(52) U.S. Cl. .................. 431/4; 431/3; 431/121
(58) Field of Classification Search .............. 431/3, 431/4, 11, 121; 60/295, 297
See application file for complete search history.

(56) References Cited

U.S. PATENT DOCUMENTS

| | | | |
|---|---|---|---|
| 4,015,548 A | 4/1977 | Schuss | |
| 5,083,434 A | 1/1992 | Dahlgren et al. | |
| 5,441,072 A * | 8/1995 | Indey et al. | 137/101.21 |
| 5,632,614 A | 5/1997 | Consadori et al. | |
| 6,662,760 B1 * | 12/2003 | Stanglmaier et al. | 123/3 |
| 6,829,890 B2 | 12/2004 | Gui et al. | |

* cited by examiner

*Primary Examiner*—Alfred Basichas
(74) *Attorney, Agent, or Firm*—DLA Piper LLP (US)

(57) ABSTRACT

A system and method for providing continuous measurement and control of a combustion device by altering the fuel composition delivered thereto. The system includes devices for sensing related information, such as fuel characteristics, combustion characteristics, or other device characteristics, and controlling the performance of the combustion device based on the sensed information. Performance control occurs via addition of one or more additives to the fuel to adjust combustion characteristics. Via such sensing and performance control, consistent combustion device performance may be maintained, despite varying fuel characteristics. In one variation, sensing occurs for the fuel delivered to the combustion device, and one or more additives are added to the fuel, based on the composition and flow rate for the fuel. In another variation, characteristics of the combustion device in operation, such as flame characteristics, are sensed and used to adjust fuel characteristics via iterative addition of one or more additives.

22 Claims, 5 Drawing Sheets

SYSTEM AND METHOD FOR FLAME STABILIZATION AND CONTROL

The present invention claims priority to Provisional Application Ser. No. 60/535,716, filed Jan. 12, 2004, entitled "System and Method for Flame Stabilization and Control," which is hereby incorporated by reference. The present invention also claims priority to Provisional Application Ser. No. 60/634,286, filed Dec. 9, 2004, entitled "Dilution of Gaseous Fuels with Inert Gases to Maintain Constant Combustion Characteristics," which is also hereby incorporated by reference.

FIELD OF THE INVENTION

The invention relates generally to combustion-related devices, and specifically to combustion-related devices that monitor and control combustion via control of one or more additives to a fuel feed.

BRIEF DESCRIPTION OF EMBODIMENTS OF THE INVENTION

Description of Embodiments of the Method and System

Embodiments of the present invention provide methods and systems for real-time or near real-time sensing or otherwise determining combustion related information, such as fuel characteristics, combustion characteristics, or other device characteristics, and controlling the performance of a combustion device (e.g., a turbine or other device containing a combustor), based on the sensed information, using an additive to the fuel to adjust one or more combustion characteristics. Via such sensing and performance control, for example, consistent combustion device performance may be maintained, despite varying inputs or other factors, such as varying fuel quality or type. Such variations in fuel may include, for example, variations in combustion characteristics for natural gas, depending on the source of the natural gas, or variations in fuel type to be used for the combustion device.

In a first embodiment, combustion device performance is controlled (indirectly) via sensing of fuel characteristics and addition of one or more additives to the fuel feed, as necessary. For example, in one variation of this embodiment, fuel characteristics (e.g., fuel feed rate and chemical or other aspects of the fuel relating to combustion performance of the fuel) for the fuel to be fed to the combustion device are monitored, such as via fuel composition and feed rate sensors. The monitored results are compared to an acceptable range of fuel characteristics (e.g., a range of fuel characteristics that produce acceptable combustor performance), and if the monitored results are outside the acceptable range, an appropriate amount of an available fuel additive is determined, and the additive is added to the fuel feed, so as to produce combustor performance that would have resulted had the fuel been within the acceptable range.

For example, if the fuel without additive is determined by analysis of the fuel to produce too slow of a flame speed within the combustor, an appropriate calculated amount of combustion enhancer (based, for example, on calculated combustion enhancement with the additive, given the sensed rate of fuel feed) as an additive is added to the fuel feed, so as to increase the flame speed to an acceptable level. On the other hand, if the fuel without additive is determined by analysis of the fuel to produce too fast of a flame speed within the combustor, an appropriate calculated amount of combustion retardant as an additive is added to the fuel feed, so as to decrease the flame speed to an acceptable level. In this embodiment, once the proper additive characteristics for the fuel are determined, no continuous additional monitoring and control is necessary (although additional monitoring and control may optionally be used, either at the fuel or combustion end of the combustion device, so as, for example, to maintain combustion quality).

In a second embodiment, combustion device performance is controlled via sensing of combustor performance characteristics, with addition of one or more additives to the fuel feed being provided, as necessary, to place the combustor within an acceptable performance range. For example, in one variation of this embodiment, combustion performance characteristics (e.g., pressure produced in the combustor, combustion or emission products, temperature, or other combustion features) are monitored, and the monitored results are compared to an acceptable range of combustion performance characteristics (e.g., a range of combustion characteristics that produce acceptable combustor performance). If the monitored results are outside the acceptable range, an appropriate amount of an available fuel additive is added to the fuel feed, and combustor characteristics are remonitored to determine if the results are within the acceptable range. This process is repeated, as a continuous feedback loop, until the combustion characteristics fall within an acceptable range, and additive feed is then maintained.

For example, if the fuel without additive is determined by combustor performance characteristics to produce too low of a flame temperature within the combustor, a feed of a combustion enhancer as an additive is added to the fuel feed, so as to produce an increase in the flame temperature. If an acceptable flame temperature is reached, the feed of additive is maintained; otherwise, more additive is iteratively added until an acceptable flame temperature is reached. Similarly, if the fuel without additive is determined by combustor performance characteristics to produce too high of a flame temperature within the combustor, a feed of a combustion retardant as an additive is added to the fuel feed, so as to produce a decrease in the flame temperature. If an acceptable flame temperature is reached, the feed of additive is maintained, otherwise, more additive is iteratively added until an acceptable flame temperature is reached.

In an exemplary second variation of the second embodiment, other (non-combustion) characteristics of the combustion device are monitored to determine performance, and additive is added, as necessary, so as to place or maintain the combustion device within an acceptable performance range.

For example, vibration in the combustion device may result if pressure fluctuations within the combustor are too high. Similarly to the first variation for this embodiment, an additive to produce an increase in pressure in the combustor is iteratively added to the fuel feed until acceptable performance (e.g., acceptable vibration level) is produced for the combustion device.

In each variation of the second embodiment, sensed fuel feed rates and fuel characteristics or other information may be used in conjunction with the sensed combustion device characteristics so as, for example, to more precisely determine and control additive feed.

In order to carry out these functions with a combustion device, each of the embodiments of the present invention generally utilize one or more sensors, one or more sources of additives, one or more additive flow control devices (e.g., valves) having one or more corresponding control mechanisms, and one or more processors or processing devices to receive the sensor input, to optionally determine appropriate amounts of additive to add to the fuel flow (depending on the embodiment), and to direct the operation of the additive flow control devices via the control mechanisms.

Combustion Device

The combustion device usable with the present invention may comprise any a number of known or developed combustor or burner devices used to combust fuel and that may be used for any number of purposes that such devices are typically used. For example, the combustion device may comprise a turbine or reciprocating engine designed to use natural gas or other fuel (or, for example, capable of running on, or being adjusted to run on, a variety of fuels) for power generation.

Sensors

A wide number of sensors are usable with the present invention. For example, such sensors usable with the present invention can directly or indirectly measure fuel composition, or combustion properties, or both. When directly measuring fuel composition, a number of techniques can be utilized within the sensors (or, for example within the processors or processing devices coupled to the sensors, as described further below) to measure the amounts of the various chemical species that make up the fuel. These techniques include, but are not limited to: infrared absorption spectroscopy; Fourier Transform Infra-Red (FTIR) spectroscopy; Raman spectroscopy; gas chromatography; mass spectrometry; nuclear magnetic resonance; electron spin resonance; or ion mobility spectroscopy; or any combination thereof.

When indirectly measuring fuel composition, the procedures that can be utilized include, but are not limited to, the following: use of flame ionization detectors (FID); thermal conductivity measurement; heat capacity measurement; speed of sound measurement; or density measurement; or any combination thereof. Particularly when used with embodiments involving indirect measurment, the sensors can also measure or be used to determine indices of combustion performance, as necessary, including a Wobbe Index, as described in detail below, and the sensors can include known types and methods designed to measure flow rate for the fuel.

With regard to flame sensing (direct measurement), sensors can be used to measure combustion stability by, for example, measuring flame location or oscillation or both utilizing (but not limited to) one or more of the following: a chemiluminescence detector; a flame scanner; a flame imager; or a flame detector. The sensors can also be selected or configured to measure combustion stability by measuring, for example, combustion chamber pressure and pressure fluctuations, or an accelerometer may be used to measure vibrations in the combustion device resulting from combustion induced pressure oscillations. Combustion performance can be measured by measuring such characteristics as combustion flame temperature; exhaust temperature; or emissions; or any combination thereof.

Processor

The processor (also interchangeably referred to herein as a "processing device" or "controller") can perform calculations to assess combustion performance or stability based on inputs from the sensors or other information, and is capable of generating control signals, mechanical or hydraulic operations, or other control functions for the additive system (e.g., to control valves or other mechanisms to control additive feed), such that constant combustion performance and/or stability is produced and maintained. The controller can control the properties of the input fuel to the combustor (e.g., by controlling feed of one or more additives), such that, for example, both constant heat rate and fuel jet characteristics can be maintained. The controller can also maintain constant combustion properties by such methods as maintaining a constant index of combustion. The index, as described below, can be a Wobbe Index, or a Weaver Index, or both (or some other index devised to characterize combustion properties of a fuel).

The controller can also maintain stable combustion by, for example, adjusting flame speed or some other primary combustion property (e.g., through control of the amount of additive added to the fuel). The controller can be an analog device, such as a PID (Proportional, Integral, Derivative) controller generating the control output from the input signal through the use of tuned control coefficients. The controller can also be a digital device, such as a PLC (Programmable Logic Controller) or computer. A computer can mimic an analog device in software, or it can use the information from the sensing system to calculate a combustion index or other fuel property and then calculate the required additive level to maintain a predetermined value of the index or property. The controller may be a stand-alone device, or may comprise more than one coupled device, including devices forming or coupled to a network, such as the Internet. Such a device or devices may have a "learning" capability, which allows the invention to self-optimize the controlling algorithms based on operational experience, as applicable for some embodiments.

Output of the controller may also be correlated with combustion device stability and used as a stability indicator. The stability indicator may be used to shut down the combustion device before a severe loss of stability occurs. In addition, the stability indicator may be used as part of or in conjunction with other features for a combustion device, such as to develop an operating record to aid in determining the cause of upsets.

Figure 1:
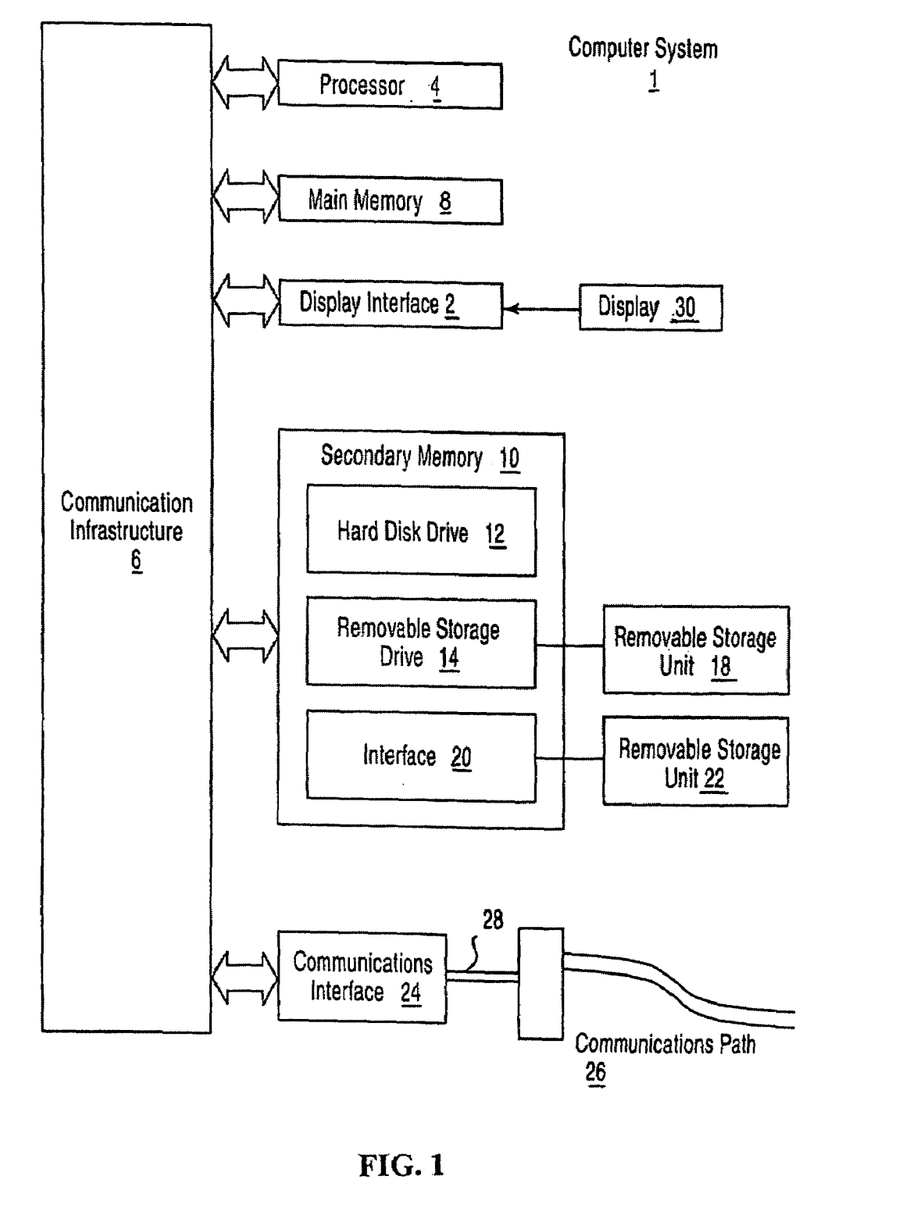
FIG. 1 contains a block diagram of various computer system components for use with an exemplary implementation of a control system for fuel feed for a combustion device, in accordance with an embodiment of the present invention.

As shown in FIG. 1, the controller of the present invention may be implemented using hardware, software or a combination thereof and may be implemented in one or more computer systems or other processing systems. In one embodiment, the invention is directed toward one or more computer systems capable of carrying out the functionality described herein.

Computer system 1 includes one or more processors, such as processor 4. The processor 4 is connected to a communication infrastructure 6 (e.g., a communications bus, crossover bar, or network). Various software embodiments are described in terms of this exemplary computer system. After reading this description, it will become apparent to a person skilled in the relevant art(s) how to implement the invention using other computer systems and/or architectures.

Computer system 1 can include a display interface 2 that forwards graphics, text, and other data from the communication infrastructure 6 (or from a frame buffer not shown) for display on the display unit 30. Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1. The invention is directed to such computer program products.

Computer programs (also referred to as computer control logic) are stored in main memory 8 and/or secondary memory 10. Computer programs may also be received via communications interface 24. Such computer programs, when executed, enable the computer system 1 to perform the features of the present invention, as discussed herein. In particular, the computer programs, when executed, enable the processor 4 to perform the features of the present invention. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Additive Feed

The additive feed portion of the present invention provides capability to add the additives to the fuel, as appropriate, per the controller calculations or other controller function. The additive feed portion of the present invention can include, but does not require, a reservoir for holding additives. The additive portion of the present invention can also add additives "on the fly" by using readily available material, such as steam, air, readily available exhaust gases, or other generated or generatable material. Such additives can be generated, for example, by taking a component (e.g., air or water) and separating it into one or more components to be used with the present invention, or by generating a reaction to a particular component.

Such additives can derived, for example, from exhaust gases or via use of air separation methods, and can also include or use of steam or water. In addition, the additives in the additive system can comprise reactive chemical species, which act, for example, as combustion enhancers, including, but not limited to: hydrogen ($H_2$); acetylene ($C_2H_2$); nitrous oxide ($N_2O$); or any combination thereof. To function as combustion retardants, the additives can comprise inert diluents, including, but not limited to: nitrogen ($N_2$); air; oxygen depleted air; carbon dioxide ($CO_2$); recirculated exhaust gas; water; or steam; or any combination thereof. Combustion retardant additives can also similarly comprise flame retarding species, including, but not limited to halogen containing species.

The additive feed portion of the present invention can comprise metering valves or other valves or control mechanisms to control how much additive is mixed with the fuel, as well as electronic, mechanical, hydraulic, or other operating mechanisms to control operation of the control mechanisms. The metering valves, either directly or through such control mechanism or mechanisms, can be controlled, for example, via coupling to the controller.

Properties of Fuel and Combustion Devices

The following fuel and combustion device information and properties are generally applicable to systems and methods for implementing embodiments of the present invention.

Fuel Characteristics

Certain fuel characteristics help determine whether different fuels will behave similarly in the same combustion device. If a parameter known as the Wobbe Index is the same for both fuels, they will often behave similarly in a given combustion system. A Wobbe Index (WI) is defined as the ratio of the volumetric calorific value of the fuel to the square-root of the fuel density. When the WI is the same for two fuels, heat input to the device for the two fuels will be approximately equal, with same pressure drop across the fuel inlet nozzles. Fuel jet penetration and thus fuel-air mixing will also be approximately the same. Thus, maintaining a constant fuel WI is important to maintaining constant performance of a combustion device.

The WI was originally developed to determine the interchangeability of fuels burned in diffusion flame combustors and simple premixed burners that operate in a stable combustion regime, for which constant heat rate is a suitable constraint on gas interchangeability. Lean, premixed Dry Low Emissions (DLE) combustors (such as those used in modern gas turbines used for power generation), however, operate in a less stable combustion regime, so heat rate alone is typically not a sufficient constraint to guarantee consistent operation. Thus, application of the WI for computing interchangeability in lean-premixed combustors may not always be sufficient, without consideration of further constraints. Other indices have been developed that monitor for interchangeability of other flame properties. For example, the Weaver Index compares the heat release, flame lift, flashback, and yellow tipping of a proposed substitute gas, relative to a reference gas, for a combustion application. In addition, fundamental combustion properties, such as flame speed, may also be monitored for use as part of a method to predict combustion stability.

Combustion stability control may thus be achieved by adjusting the chemical composition of the fuel mixture entering the combustor, so that fuel characteristics, like those described above, are controlled. This may be accomplished by changing the fuel stream composition through the addition of additives to the fuel mixture. Additives can increase or decrease flame speed, flame temperature, or volumetric heat release rate, for example. Additives include, but are not limited to: reactive chemical species (e.g., hydrogen, acetylene, or N2O); diluents (e.g., nitrogen, CO2, steam, or recirculated exhaust gases); or flame-radical scavenging chemical species (e.g., halogen containing species); or any combination thereof.

Premixed Combustion Devices and Burners

Premixed combustion devices usable with the present invention can include, but are not limited to, those used in low-emissions gas turbines, for which operation may suffer in the face of variable natural gas or other feed gas (such as process gas or syngas) composition. Premixed combustion systems that are tuned for very low pollutant emissions operate in a narrow stability region between flashback and blow-off. Flashback occurs when the flame speed is faster than the flow velocity through the combustor, allowing flame propagation upstream. Blow-off occurs when the flame speed is slower than the flow velocity through the combustor, allowing the flame to be blown downstream and extinguished. Flame speed must generally equal flow velocity for stable combustion. Numerous techniques are used to stabilize the flame so that flame speed does not have to exactly match flow velocity.

These constraints result in a small window of stability; however, too great a mismatch between flame speed and flow velocity can still result in flashback or blow-off. Since flame speed is a function of fuel composition, stability problems can arise due to the variable composition of natural gas or other feed gases (see, e.g., "Influence of Variations in the Natural Gas Properties on the Combustion Process in Terms of Emissions and Pulsations for a Heavy Duty Gas Turbine" by L. Nord and H. Andersen, the contents of which are hereby incorporated by reference in their entirety). Premixed combustors are particularly sensitive to variability of fuel properties, as the premixing depends critically on control of the fluid mechanics, and flame stability is dependent on fluid mechanics and chemical kinetics. The loss of flame stability leads to pressure fluctuations and pulsations, and resonant acoustics, which can cause damage to and degradation of hot section components. (These characteristics, however, also may be sensed or otherwise utilized to assist with operation of the combustion device, in accordance with some embodiments of the present invention.)

Example Embodiments

Combustor performance may be measured and/or sensed in numerous ways. For example, combustor performance may be measured and/or sensed directly by determining performance characteristics of the combustion device, or performance may be measured and/or sensed indirectly by determining fuel characteristics. In both of these examples, the addition of additives (e.g., reactive species, reaction inhibiting species, or inert diluents) to the fuel can be used to cause a change in the fuel composition. The direct measurement may be used as the input in a feedback type control loop, while the indirect measurement may be used as the input in a feed-forward type control loop.

Figure 2:
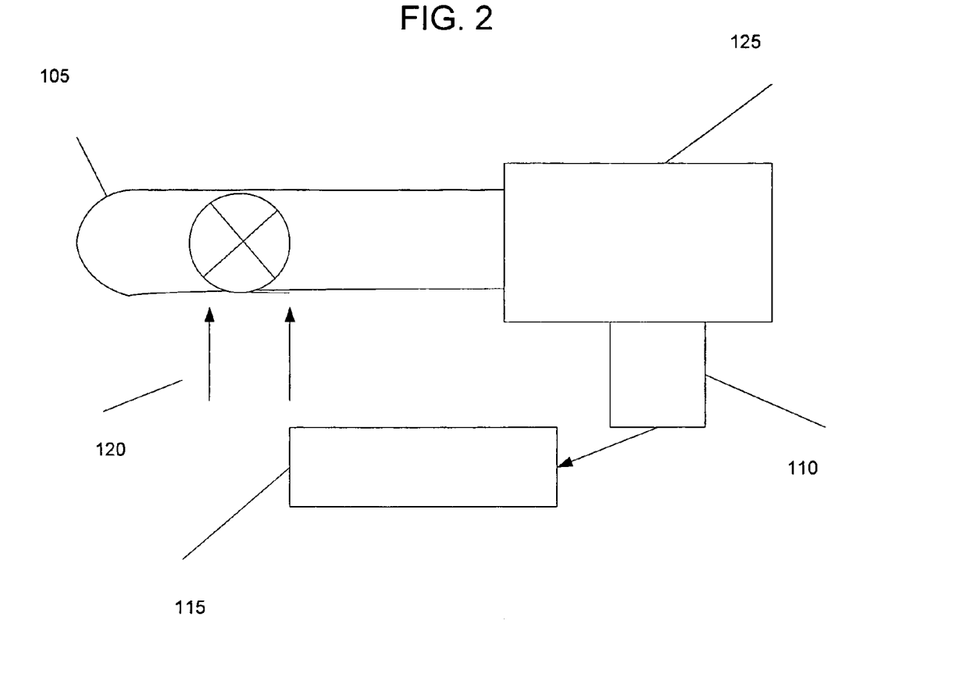
FIG. 2 illustrates an example of a system that determines combustion performance directly, according to one embodiment of the invention.

Combustion performance may be determined directly by determining performance characteristics of a combustion device. For example, stability can be determined by measuring an indicator of flame position in the combustor, such as flame chemiluminescence, or by sensing flame intermittency by detecting, for example, the acoustic or optical (chemiluminescence) emissions generated by the flame. FIG. 2 illustrates an example of a system that determines combustion performance directly, according to one embodiment of the invention. As illustrated in FIG. 2, the system comprises: a fuel line 105; a sensing system 110; a controller 115 to access the information from the sensing system 110 (e.g., to control the fuel composition or provide a stability risk assessment, data records, and emissions predictions); an additive system 120 to control the fuel additive(s) using the information provided by the controller 115; and a combustor 125 to burn the fuel.

Figure 3:
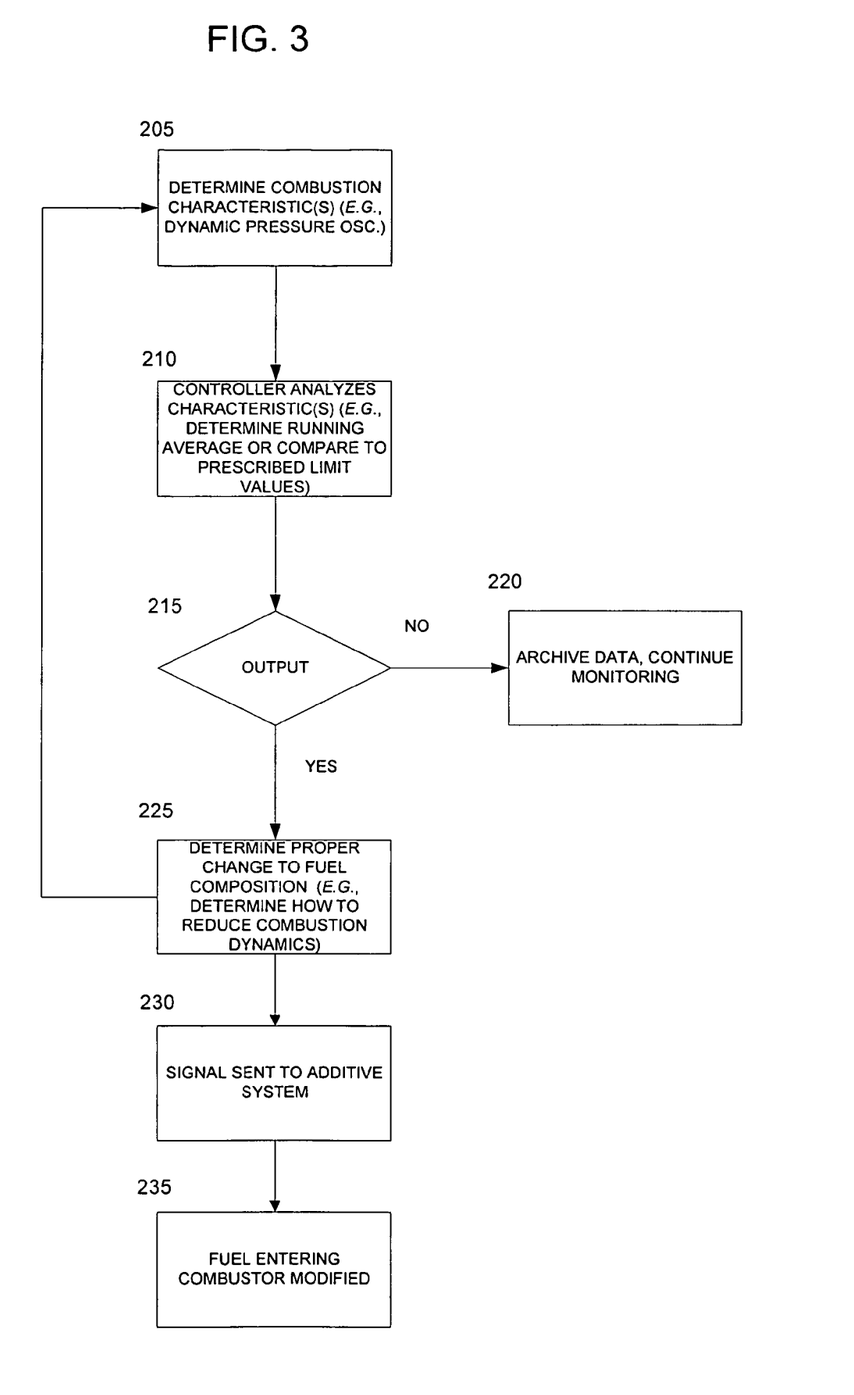
FIG. 3 illustrates an example of a method for determining combustion performance directly, according to one embodiment of the invention.

FIG. 3 illustrates an example of a method that determines combustion performance directly, according to one embodiment of the invention. In step 205, at least one combustion characteristic is determined using the sensing system. For example, a flame or combustor characteristic such as dynamic pressure oscillations could be measured. These dynamic pressure oscillations could be measured using a pressure transducer that indicates changes in combustor pressure as a function of time. In step 210, the controller analyzes the combustion characteristic(s). Thus, for example, the dynamic pressure oscillations could be analyzed to determine a running average or be compared to prescribed limit values. If the analysis indicates that the combustor performance is deteriorating, some change to fuel composition may be needed. In step 215, the output from the controller determines if the fuel composition should be changed to correct a combustion dynamics problem. If no problem is indicated (e.g., fuel composition is within predetermined acceptable range for combustion device operation), in step 220, the data can be archived, and the system can continue to be monitored. If there is a problem (e.g., fuel composition is outside of predetermined acceptable range for combustion device operation), in step 225, the proper change to the fuel composition (e.g., addition of appropriate additive to fuel feed) is determined. The change to the fuel composition can be determined from, for example, prior experience with a particular combustion system, from computation of a stability index or fundamental flame property, or by other information or method. In step 230, a signal is sent to the additive system indicating that a certain amount of additive should be mixed into the fuel stream. In step 235, the fuel entering the combustor is modified accordingly (e.g., by causing the opening or adjusting of a valve). Thus, in the example, the fuel entering the combustor is modified by the addition of the additive to have combustion characteristics that produce a more stable flame. These steps comprise a feedback control loop that may require iteration or other techniques to optimize the additive process.

Figure 4:
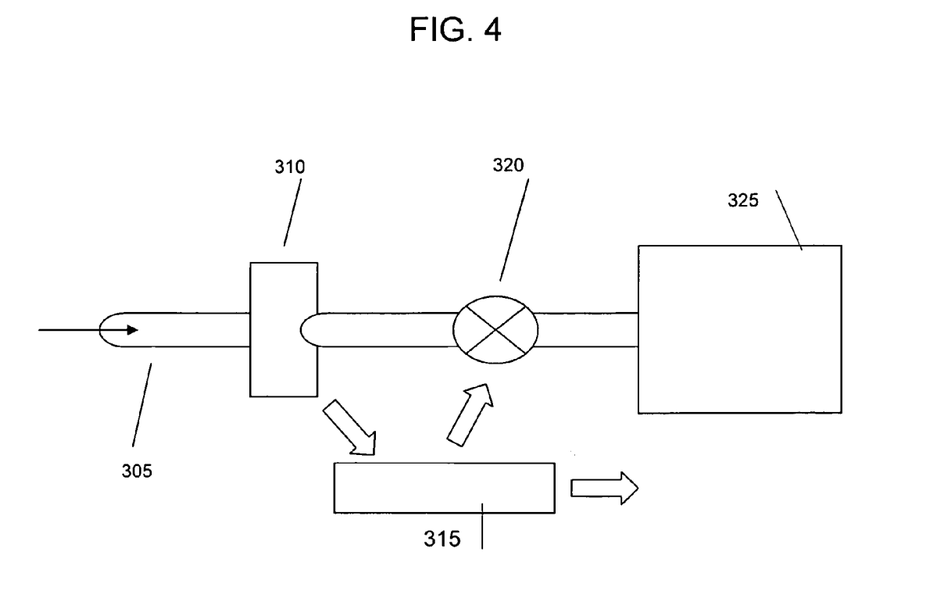
FIG. 4 illustrates an example of a system that determines combustion performance indirectly, according to one embodiment of the invention.

Combustion performance may also be determined indirectly by measuring fuel characteristics (e.g., chemical composition, density and heating value) and inferring combustion behavior. FIG. 4 illustrates an example of a system that determines combustion performance indirectly, according to one embodiment of the invention.

As illustrated in FIG. 4, the system comprises: a fuel line 305; a combustor 325 to burn the fuel; a sensing system 310; a controller 315 to access the information from the sensing system and determine how much fuel additive(s) to add or otherwise select to vary the additive(s) delivered to the fuel; and an additive system 320 to store and control the flow of the additive(s) into the fuel line.

Figure 5:
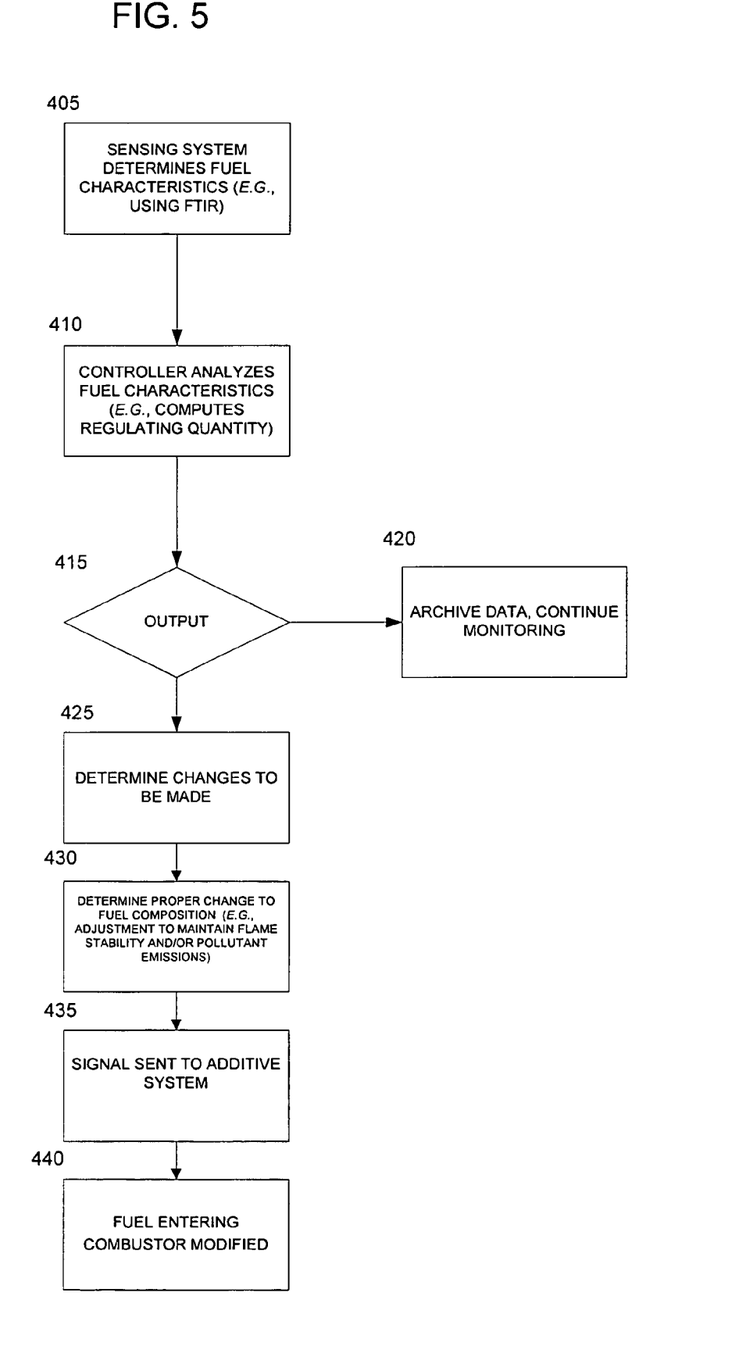
FIG. 5 illustrates an example of a method for determining combustion performance indirectly, according to one embodiment of the invention.

FIG. 5 illustrates an example of a method that determines combustion performance indirectly, according to one embodiment of the invention. In step 405, the sensing system determines the fuel characteristics. Thus, for example, the sensing system can utilize an FTIR spectrometer to measure the individual chemical species that make up the fuel. In step 410, the controller analyzes the fuel characteristics. Thus, for example, the controller utilizes the fuel composition to compute a regulating quantity, such as the flame speed, and/or Wobbe Index or another stability index. In step 415, the output from the controller is analyzed to determine if the fuel composition should be changed to meet this goal (e.g., to fall within a predetermined range). Thus, for example, if the composition of the fuel is changing, such that the regulating quantity indicates a flame stability problem, the composition can be altered before combustion problems arise. If the value of the regulating quantity does not need to be changed, in step 420 the data can be archived, and the regulating quantity can continue to be monitored. If value of the regulating quantity does need to be changed, in step 425, a determination is made that changes need to be made. The changes to fuel composition required to alter the value of the regulating quantity may require addition of a diluent or reactive species to obtain the necessary alteration of combustion characteristics In step 430, the proper change to the fuel composition is determined. Thus, for example, the adjustment required to the fuel composition to maintain flame stability and/or pollutant emissions is determined. In step 435, a signal is sent to the additive system 320 controlling the amount of either diluent or reactive species to be mixed into the fuel stream to obtain the required composition and hence value of regulating quantity. In step 440, the fuel entering the combustor is modified accordingly thus improving the flame stability characteristics in order to minimize pressure oscillations in the combustor.

Example Applications and Other Uses of Information Generated

As explained above, embodiments of the present invention can be used to stabilize a combustion system (in both premixed and non-premixed combustors), to thereby compensate for effects of time-varying fuel composition and combustion properties. In addition, the measurement of input fuel composition may also be useful. For example, emissions predictions (e.g., predicting the emissions level based on the measured chemical composition of the fuel), stability risk assessments (e.g., blow-off or flashback due to a measured chemical composition), and archival records, from which the cause of combustor upsets may be determined, can be utilized. Another application is to use the composition and/or flame speed information to perform a continuous assessment of the risk of loss of combustor stability. Furthermore, fuel composition information can be used to augment calculation of combustion device NOx emissions based on combustion device operating parameters. One embodiment could also be used with a surrogate combustor or burner for the purpose of adjusting the composition of the fuel supply to a number of combustion devices that obtain fuel from the source without the need to monitor the other combustion devices. Another embodiment could be used to control individual combustion devices by customizing the fuel sent to each combustion device. Those experienced in the art will realize that the above uses are merely examples, and that multiple other uses are possible.

The present invention is described in terms of the above embodiments. This is for convenience only and is not intended to limit the application of the present invention. In fact, after reading the description of the present invention, it will be apparent to one skilled in the relevant arts how to implement the present invention in alternative embodiments.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A fuel feed adjustment system for use with a combustion device having a fuel feed, the system comprising:
   a sensor for sensing a sensed fuel characteristic of fuel being fed to the combustion device, the sensed fuel characteristic being indicative of a fuel combustion property;
   a processor for comparing the sensed fuel characteristic to an acceptable range for the fuel characteristic, the acceptable range corresponding to a predetermined range for the fuel combustion property, and for outputting an output when the sensed fuel characteristic is outside the acceptable range; and
   an additive feed for feeding an additive to the fuel feed, the additive feed being triggered by the output, wherein the additive includes a combustion enhancer or a combustion retardant depending on whether the sensed fuel characteristic is above or below the acceptable range, and wherein an amount of additive is dependent on a sensed fuel flow rate.

2. The system of claim 1, wherein the sensor senses the sensed fuel characteristic using at least one of: infrared absorption spectroscopy; Fourier Transform Infrared Spectroscopy (FTIR); Raman spectroscopy; gas chromatography; nuclear magnetic resonance; electron spin resonance; mass spectrometry; or ion mobility spectroscopy; or any combination thereof.

3. The system of claim 1, wherein the sensor senses the sensed fuel characteristic using at least one of: a flame ionization detector (FID); a thermal conductivity measurement device; a heat capacity measurement device; a sound measurement device; or a density measurement device; or any combination thereof.

4. The system of claim 1, wherein the fuel characteristic is indicative of a fuel composition.

5. The system of claim 1, wherein, if the sensed fuel combustion property is below the predetermined combined range, the additive includes a combustion enhancer, and wherein if the sensed fuel combustion property is above the predetermined range, the additive includes a combustion retardant.

6. The system of claim 1, wherein the fuel enhancer comprises at least one reactive chemical species comprising: hydrogen; acetylene; oxygen; oxygen enhanced air; or nitrous oxide; or any combination thereof.

7. The system of claim 1, wherein the fuel retardant comprises an inert diluent comprising at least one of: nitrogen; oxygen depleted air; carbon dioxide; recirculated exhaust gas; water; or steam; or any combination thereof.

8. The system of claim 1, wherein the sensor senses indices of fuel performance.

9. The system of claim 8, wherein the indices of fuel performance comprise: a Wobbe Index; or a Weaver index; or both.

10. The system of claim 1, wherein the combustion device is a turbine.

11. The system of claim 1, wherein the combustion device is a reciprocating engine.

12. The system of claim 1, wherein the fuel feed is a natural gas feed.

13. The system of claim 1, wherein the additive feed is provided from an additive feed source.

14. The system of claim 12, wherein the additive feed is controlled via a feed control mechanism.

15. The system of claim 13, wherein the feed control mechanism comprises a metering valve.

16. The system of claim 1, wherein the processor comprises an analog controller or a digital computer or both.

17. The system of claim 1, wherein the sensed fuel characteristic is used to control feeding of a second additive feed to the fuel feed for a second combustion device.

18. The system of claim 1, wherein the fuel feed with the additive is connected to a second combustion device.

19. A fuel feed adjustment system for use with a combustion device having a fuel feed, the system comprising:
   a sensor for sensing fuel composition and a fuel feed rate;
   a processing device for comparing the sensed fuel composition to an acceptable range for fuel composition, and for outputting an output based upon the sensed fuel composition being outside the acceptable range; and
   an additive feed for feeding a selected additive to the fuel feed, the selected additive feed being triggered by the processing device output, wherein the selected additive is selected from a group consisting of a combustion enhancer and a combustion retardant, and wherein the additive feed has an additive feed rate, the additive feed rate being selected so as to produce a combined fuel and additive producing a combustion characteristic within a preselected range.

20. A method for adjusting a fuel feed for a combustion device, the method comprising:
   sensing a sensed fuel characteristic of a fuel fed to the combustion device, the sensed fuel characteristic being indicative of a fuel combustion property;
   comparing the sensed fuel characteristic to an acceptable range, the acceptable range corresponding to a predetermined range for the fuel combustion property, and outputting an output when the sensed fuel characteristic is outside the acceptable range; and
   variably feeding an additive to the fuel feed depending on the output, wherein the additive includes a combustion enhancer or a combustion retardant depending on whether the sensed fuel characteristic is below or above the acceptable range, and wherein an amount of additive is dependent on a sensed fuel flow rate.

21. The method of claim 20, wherein the additive includes a combustion enhancer if the sensed fuel combustion property is below the predetermined combined range, and wherein the additive includes a combustion retardant if the sensed fuel combustion property is above the predetermined range.

22. A fuel feed adjustment method for use with a combustion device having a fuel feed, the method comprising the steps of:
   sensing fuel composition and a fuel feed rate;
   comparing the sensed fuel composition to an acceptable range for fuel composition, and outputting an output based upon the sensed fuel composition being outside the acceptable range; and
   feeding a selected additive to the fuel feed, the selected additive feed being triggered by the output, wherein the selected additive is selected from a group consisting of a combustion enhancer and a combustion retardant, and wherein the additive feed has an additive feed rate, the additive feed rate being selected so as to produce a combined fuel and additive producing a combustion characteristic within a preselected range.

* * * * *